United States Patent [19]

Gutierrez et al.

[11] 4,430,212

[45] Feb. 7, 1984

[54] VOLUMETRIC FILTER FOR LIQUID LEVEL MEASUREMENT DEVICES

[76] Inventors: Manuel Gutierrez, 1273 Meadow Sweet Rd., Golden, Colo. 80401; Michael A. Gutierrez, 636 S. Addison, Lexington, Ky. 40504

[21] Appl. No.: 411,146

[22] Filed: Aug. 25, 1982

[51] Int. Cl.³ .............................................. B03D 3/00
[52] U.S. Cl. .................................. 210/104; 210/532.1
[58] Field of Search ............ 210/97, 104, 96.1, 532.1, 210/534, 535

[56] References Cited

U.S. PATENT DOCUMENTS

| | | | |
|---|---|---|---|
| 1,150,360 | 8/1915 | Grevemberg | 210/534 X |
| 1,416,899 | 5/1922 | Sirch | 210/534 |
| 2,468,791 | 5/1949 | Thompson | 210/96.1 |
| 2,762,511 | 9/1956 | Sternaman | 210/535 |

*Primary Examiner*—John Adee
*Attorney, Agent, or Firm*—Thomas Zack

[57] ABSTRACT

A volumetric filtering device is provided for use in a liquid level measuring apparatus. The device includes a communicating passageway between a first container for the liquid and a second container in which the measurement is to be made. The communicating passageway is provided with a first opening to the first container and a second opening to the second container, the first opening being located at a higher vertical displacement than the second opening. The described filter prevents passage of suspended particles, sediments, solids and other precipitants, as well as the passage of air bubbles, from the first container to the second container. The filter structure is also useful to prevent passage of a buoyant liquid, floating in a layer above the liquid to be measured, from the first to the second container. The passageway is volumetrically chosen to assure that none of the buoyant liquid will pass therethrough. A further vertical tubular component is provided to reduce the volumetric requirements of the communicating passageway. The tubular component includes an inlet-drain hole and a vent hole, both in communication with the liquid in container 1, and a sensing port in communication with the upper opening of the communicating passageway.

3 Claims, 6 Drawing Figures

VOLUMETRIC FILTER FOR LIQUID LEVEL MEASUREMENT DEVICES

TECHNICAL FIELD

This invention relates to the field of liquid level measurement, and more particularly to filters for protecting electronic sensors for use in liquid level measurement devices.

In the field of liquid level measurement, it is known to use electronic sensors. Such sensors are typically used in devices for remote measurement of meteorological precipitation, for example. Typical precipitation gauges are described in Nilsson, U.S. Pat. No. 3,229,519, Luchessa et al, U.S. Pat. No. 4,292,843, Chadwick, U.S. Pat. No. 3,372,586, and Campbell, U.S. Pat. No. 2,176,886, for example. Preferably, such precipitation measuring devices provide remote signals indicative of precipitation accumulated therein. Thus, electronic sensing of accumulated precipitation is a desirable feature. As described in the Campbell patent, such measurement may be achieved by the use of an electrode wire for sensing the precipitation. It is also known to use capacitance liquid level sensing devices, as described in the Gutierrez patent applications, Ser. No. 48,408, filed June 4, 1979, and 219,705, a Continuation-in-Part thereof, filed Dec. 24, 1980, for Capacitance Probe Sensor Device now U.S. Pat. No. 4,389,900, incorporated herein by reference. Similarly, Schmidt U.S. Pat. No. 4,212,202, pertains to the use of a capacitance probe for measurement of fuel in an aircraft fuel tank. As shown in the 4,212,202 and 2,176,886 patents, for example, such electronic measurement devices typically immerse the electronic probes within the liquid to be measured. Alternatively, the actual measurement of liquid level may be made in a separate housing, as disclosed in the 3,229,519 patent.

In the art of meterological precipitation measurement, it has become the practice to add an antifreeze solution to the liquid measurement devices, in order to obtain accurate level measurements for various types of precipitation in sub-freezing temperatures. Further, in order to retard evaporation of the accumulated liquid during warm temperatures, a layer of oil is provided on top of the antifreeze mixture. This practice is described in the 3,372,586 and 4,292,843 patents, for example.

While the use of an oil layer provides the advantage of reduction of evaporation, an undesirable side effect results in that oil residue accumulating between a pair of capacitive, or other, electrical sensing probes and may yield an inaccurate precipitation reading.

Additionally, in electronic liquid level measurement devices, the presence of turbulence, as manifested by air bubbles, for example, and of suspended sediments and solids within the liquid may similarly affect the resistive or capacitive properties of the liquid and result in erroneous level indications.

There is accordingly a need in the prior art for filtering devices to prevent oil films from coming in contact with electronic sensing probes, and to prevent other impurities, whether suspended solids or turbulent air bubbles, from entering a housing for the sensing probe wherein the level measurement is made.

DISCLOSURE OF THE INVENTION

It is accordingly an object of the present invention to overcome the difficulties of the prior art and to provide a filtering apparatus for liquid level measurement devices, in order to prevent foreign substances from passing into a sensor housing.

It is a more specific object of the invention to provide a filtering apparatus for preventing passage of oil films, air bubbles, suspended sediment, and the like, from a container for a liquid whose height is to be measured to a second container housing a measurement device.

In a broader sense, it is an object of the present invention to provide a volumetric filtering device for preventing impurities, such as a layer of buoyant fluid, sedimentation or other precipitation floating above or within a second fluid in a first container from passing to a second container in communication with the first container.

In accordance with one aspect of the present invention there is thus provided a connecting structure between a pair of containers. The connecting structure is provided with a first opening in a first container, housing a liquid and the various impurities therein, and a second opening in a second container for passing only the liquid to be measured thereto, in which the first opening is at a higher level than the second opening.

A more specific feature of the present invention provides for the volume of the connecting structure to be no less than the volume displaced within the second container by the height of a buoyant fluid floating atop the liquid in the first container.

In accordance with another feature of the present invention, the connecting structure is provided with a tubular device in the first container, having an inlet and drain opening at its bottom, a venting opening at its top, and a port opening therebetween for connecting with a connecting tube descending downwardly therefrom to the second container. Preferably, the connecting structure provides the only communication path for liquid from the first container to the second container, the second container being appropriately sealed at its bottom portion to insure that this condition is met even if the second container is within the liquid in the first container.

BRIEF DESCRIPTION OF THE DRAWINGS

The foregoing and other features, objects and advantages of the present invention will be more readily appreciated upon reference to the following description of a best mode for carrying out the invention, when taken in conjunction with the accompanying drawings in which.

BEST MODE FOR CARRYING OUT THE INVENTION

Figure 1:
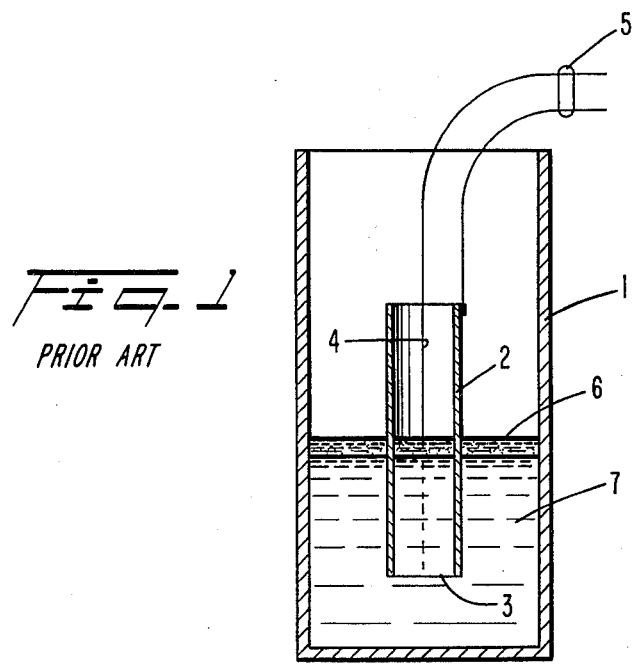
FIG. 1 shows a prior art liquid level measurement device.

FIG. 1 illustrates a typical application of the prior art measurement of precipitation. As shown therein, a first container 1 is used for retaining a liquid whose level is to be measured. Within container 1 is provided a second container 2, having an opened bottom portion 3. Container 2 includes an electrode 4. A second electrode may be provided or the container 2 may act as a ground electrode as shown in FIG. 1. Accordingly, signals are provided by electrode 4 and by the container 2 on wires 5 to a measurement apparatus, not shown. The signals on wires 5 typically represent an electrical property of the liquid within container 2. Thus, as the liquid level within container 2 rises, the signals on wires 5 change and the measurement apparatus may remotely detect the varying level of liquid. As will be understood, the addition of a layer 6 of a more buoyant liquid, such as oil, floating above a liquid 7, such as water, in container 1 results in a similar layer in container 2 between electrode 4 and the container. Thus, residue or films may be deposited by the layer 6 on the electrode or the container 2. Such deposits ultimately lead to changes in the signals on wires 5 resulting in erroneous level readings for the liquid in container 2 and thus for container 1.

Figure 2:
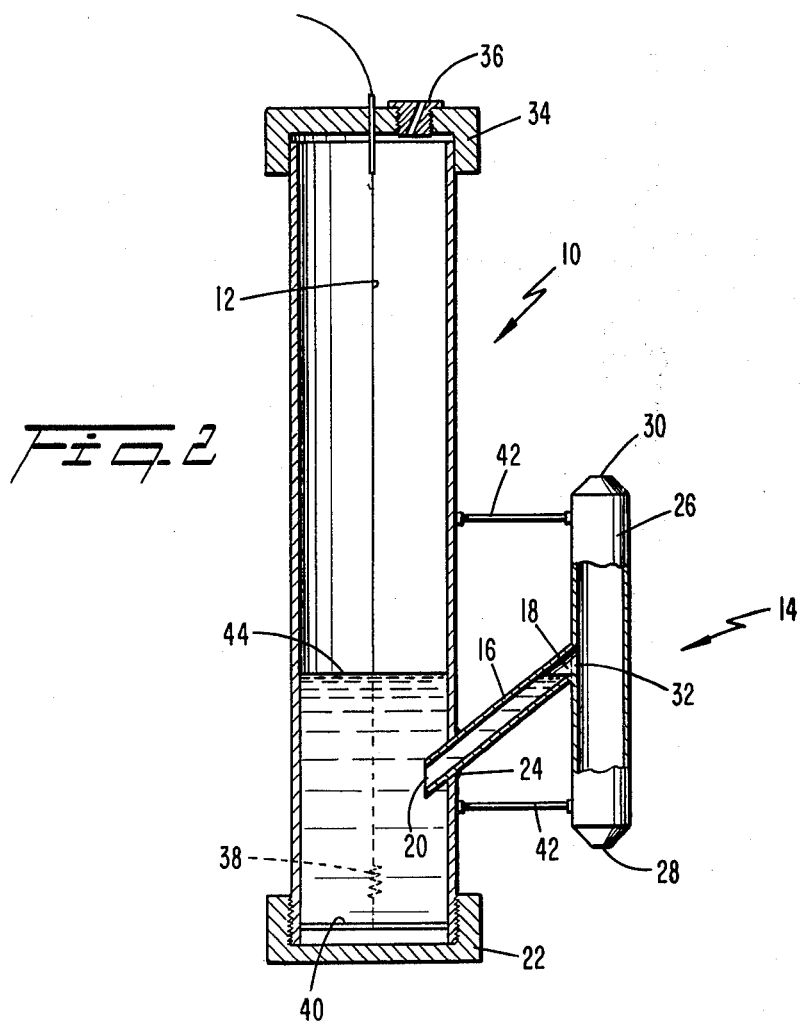
FIG. 2 shows a volumetric filter in accordance with the present invention.

In accordance with the present invention, apparatus is provided for eliminating the occurrence of layer 6 within the second container used to house the electrode for performing the actual level measurement. As shown specifically in FIG. 2, the sensing container, generally shown at 10, may be formed in a tubular structure forming a housing for electrode 12. Preferably, electrode 12 is formed of an insulated wire used as a capacitance probe to determine the quantity of liquid between the probe and the container. Such a structure is described in the Gutierrez patent, incorporated herein by reference.

In departing from the prior art, the present invention provides for communicating of fluid between the container 1 (shown in FIG. 1) and the sensing container 10 via a device 14, which includes a communicating passageway 16. The passageway is provided with a first opening 18 for receiving and discharging liquid from and into container 1. A second opening 20 is correspondingly provided for outletting and receiving liquid to and from container 10.

It is specifically pointed out that first opening 18 is located above second opening 20. Thus, if the buoyant liquid is found in passageway 16, it is buoyantly floated upwardly, that is, towards first opening 18, rather than downwardly towards second opening 20. In operation, it is noted that as the liquid level within container 1 rises towards and above first opening 18, the layer of buoyant liquid 16 will initially be forced, by static liquid pressure, into passageway 16. However, once the buoyant layer 6 is above the opening 18, any remnant buoyant liquid within passageway 16 will, as previously described, be caused to exit through first opening 18. By providing an appropriate volume for the passageway 16, a sufficient quantity of the buoyant liquid may be stored therein without passing through to container 10.

The volume requirement for passageway 16 is determined by consideration of the height of the layer 6. As will be appreciated, without use of the present invention, a layer of the buoyant liquid would be formed within container 10. The volume displaced by that layer is a function of the height of the layer and of the cross-sectional area of container 10. By providing passageway 16 with a volume no less than the volume associated with the buoyant layer which would otherwise form within container 10, it is seen that as layer 6 passes the first opening 18 the effect of the buoyant liquid will be to displace the antifreeze mixture or other liquid within communicating passageway 16 towards container 10 through second opening 20. Once layer 6 is fully above opening 18 and liquid 7 is at the first opening, any buoyant liquid within passageway 16 will float upwardly towards opening 18 to be replaced by the more dense liquid 7. Accordingly, as the liquid level rises beyond first opening 18, passageway 16 will be cleared of the buoyant liquid while passing the liquid 7, whose level is to be measured, through opening 20 to container 10 for measurement. Such volumetric considerations are seen to provide the desired filtering action, thereby preventing passage of the buoyant liquid into the sensing container 10.

The present invention may be provided to existing detectors by the simple expedient of capping the bottom opening of the container. A threaded cap 22 may be provided, or other sealing means. An opening 24 is provided in the side of container 10 for receiving therein the communicating passageway 16.

In addition to the communicating passageway 16, the inventive device may include a tubular component 26 having a first opening 28, acting as an inlet and drain hole for liquid from the container 1, and a vent hole 30. Finally, a sensing port 32 is provided for contacting opening 18 of communicating passageway 16. Tubular component 26 may be used to limit the volume requirements of passageway 16 as follows.

By providing tubular component 26 with a height differential between vent hole 30 and sensing port 32 which is no shorter than the expected thickness of layer 6 it is seen that at no time will vent hole 30 and opening 18 be simultaneously exposed to the buoyant liquid in layer 6. That is, if layer 6 extends above opening 30, then at least a portion of opening 18 will be exposed to the liquid 7 from container 1. Accordingly, the largest volume of the buoyant liquid layer 6 which might need to be temporarily stored in the communicating passageway 16 is limited to the volume contained between port 32 and vent hole 30 of tubular component 26. If tubular component 26 and communicating passageway 16 are formed of tubes having substantially the same diameters, it is apparent that the length of passageway 16 between openings 18 and 20 need be at least as large as the height of layer 6 in order to assure that none of the buoyant liquid completely passes through passageway 16 into the sensing container 10. It is understood that for such operation tubular component 26 is preferably within liquid 7 in the first container 1. The sensing container 10 may be within container 1, replacing the second container 2 of the prior art, or may be disposed externally to container 1 with passageway 16 interconnecting the two containers. As yet a further alternative, component 26 may similarly be disposed externally to container 1, and may be connected thereto through a pair of passageways connected to inlet opening 28 and to vent hole 30.

With reference to additional structure associated with the sensing container, it is noted that an upper cap 34 is fastened to the top portion thereof for sealing the sensing electrode 12 and further for retaining a breather plug 36. The upper cap 34 preferably includes a feedthrough plug (not shown) to provide a feed through for sensing electrode 12.

Electrode 12 is seen to be maintained relatively taut by a spring 38 which is attached to a wire support shown in the form of crossbar 40 for holding the spring to sensing container 10. The tubular component 26 is mounted onto container 10 by means of a pair of mounting bars 42.

The present invention thus includes a volumetric component 26 for confining the volume of the buoyant liquid retained within passageway 16. By appropriately dimensioning the tubular component 26, passageway 16 may be kept to a reasonably small volume.

It should be understood that in order to function properly, an initial level of liquid is required within container 10, sufficient to fill passageway 16 up to opening 18 with the liquid. Otherwise, it is appreciated that the layer of buoyant liquid may enter the container 10 through passageway 16, at least on the first occasion wherein the interface between the buoyant liquid and liquid 7 rises above opening 18. There is accordingly shown an initial liquid level 44 within container 10 and passageway 16.

Figure 3A:
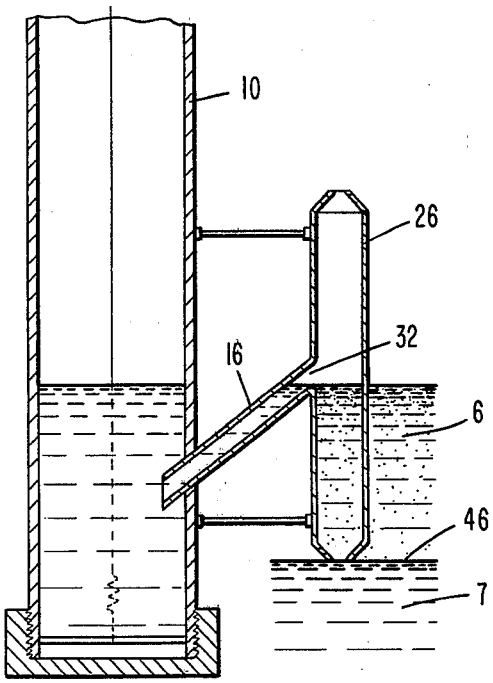
FIGS. 3A through 3D illustrate operation of the present invention.

For an understanding of the operation of the present invention, reference is made to FIGS. 3A, 3B, 3C and 3D. As seen therein, FIG. 3A illustrates the presence of an oil layer 6 below sensing port 32, and of an antifreeze solution in container 10 and within passageway 16. The oil layer is assumed below port 32 both within and without the tubular component 26.

Figure 3B:
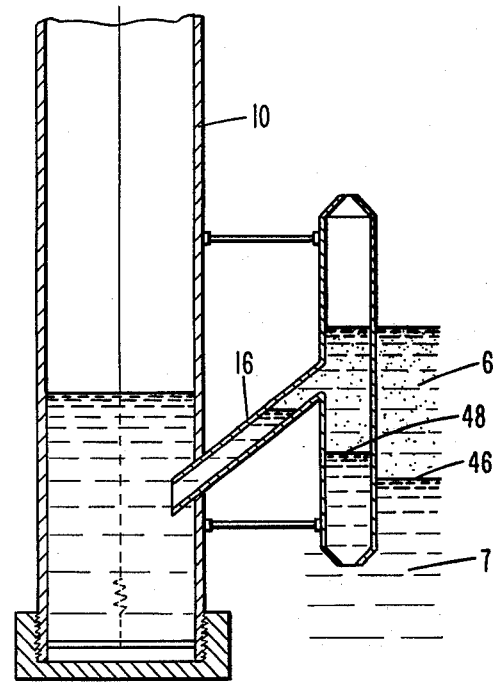

As the level of liquid to be measured, shown at FIG. 3B as interface 46 between oil layer 6 and liquid 7, begins to rise, oil layer 6 is displaced upwardly. Because the oil layer 6 is not as dense as the liquid 7, the level of liquid within container 10 rises only slightly. Oil layer 6 begins to displace some of the liquid in passageway 16, however, as seen in FIG. 3B.

Figure 3C:
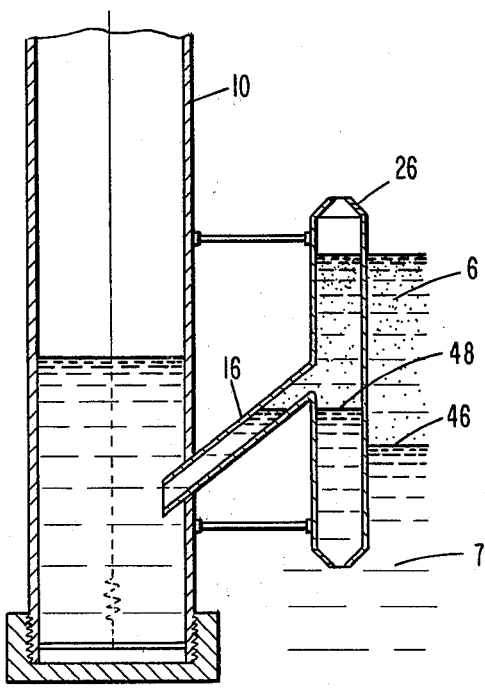
Figure 3D:
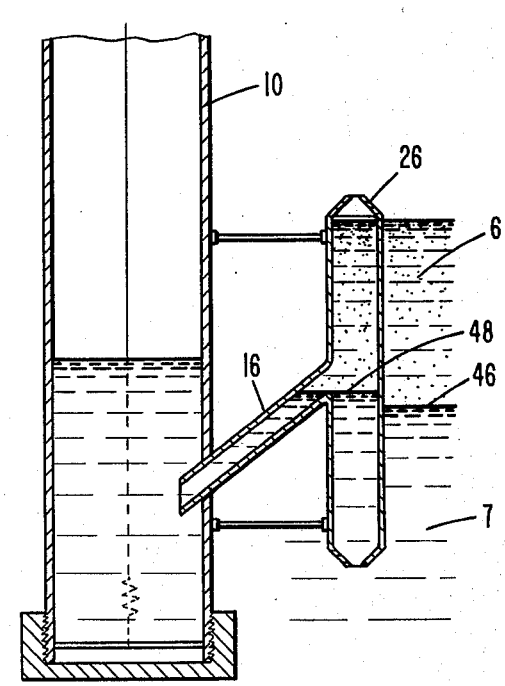

As the liquid level rises still further, as seen in FIG. 3C, the oil level continues to rise. Within tubular component 26, however, due to the restricted volume and to the displacement of liquid from communicating passageway 16 into container 10, the interface between the antifreeze mixture and the oil rises to a level 48 higher than level 46. Antifreeze level within container 10 again rises, but by only a small amount due to equalized difference in hydrostatic pressures between the antifreeze mixture within container 10 and the antifreeze mixture and oil layer within container 1 surrounding component 26. As interface 48 rises above the bottom portion of sensing port 32, the more dense antifreeze mixture within the bottom portion of component 26 will flow downwardly into passageway 16, thus displacing the oil therein which buoyantly floats upwardly. This situation is shown in FIG. 3D, and it will be appreciated that any further rise in the level of the antifreeze mixture as symbolized by interface 46 is associated with substantially corresponding increments in the level of interface 48 as well as the level of the antifreeze mixture within container 10. Thus, none of the oil, or buoyant liquid in layer 6, will contaminate the liquid in container 10.

Similarly, the inventive structure 14 provides filtration of any sedimentation or other materials found in the liquid within container 1. Specifically, if any particles enter tubular component 26 and such particles are buoyantly supported by the liquid, they will tend to travel upwardly vertically. Accordingly, such particles will not, upon reaching sensing port 32, travel downwardly in passageway 16 to contaminate the liquid in container 10. Similarly, air bubbles which might pass through bottom opening 28 of component 26 will tend to travel vertically upwardly, and will not enter container 10. Measurement within container 10 will thus not be disrupted by erroneous values due to air bubbles or light precipitants.

With respect to heavier particles which might be suspended within the liquids and which may pass through opening 28 into component 26, such particles tend to travel vertically downwardly. Thus, in the absence of turbulence within component 26, any such particle located above the sensing port 32 will tend to sink vertically downwardly, and to drain through opening 28, rather than to move angularly downwardly from sensing port 32 through to passageway 16 for passage into container 10.

The structure of device 14 thus provides filtration both of sedimentation and precipitants, as well as prevention of air bubbles or buoyant liquids from passing through to the sensing container 10. As a result, a liquid property sensing mechanism of whatever type is protected against formation of deposits, films or the like, thereby assuring greater and longer term accuracy of the readings provided thereby.

Preferably, passageway 16 is comprised of a metal tubing inserted and soldered, welded, or otherwise sealed to the lower part of a tube formed as component 26. The other end of the tube forming passageway 16 is inserted into and soldered, or otherwise sealed, to container 10. Tube 26 is open at both ends thereby allowing liquid movement and pressure equalization between the outside pressure of container 1 and container 10. For volumetric considerations, the tube forming component 26 is preferably of a diameter no greater than the diameter of the tubing forming passageway 16. As previously described, the distance between sensing port 32 and vent hole 30 should equal or exceed the maximum height expected of any oil layer, and the length of passageway 16 should equal or exceed that distance. Such requirements are not necessary for use of the present volumetric filter to prevent sediment, precipitates or air bubbles from passing through to container 10. For purposes of symmetry, the distance from sensing port 32 to the bottom opening 28 of tubular component 26 should approximate or equal the distance from sensing port 32 to vent hole 30.

While the present invention may function without tubular component 26, the upper portion thereof advantageously provides volumetric limitation of requirements for passageway 16. Both the upper and lower portions, however, serve to enhance filtration action by isolating passageway 16 from the effects of pressure undulations within liquid 7. Such undulations, which may result from the effects of a solid, such as is found in snow, sleet or hail, falling into container 1, or from other causes, may lead to undesirable effects if either the upper or lower portions of component 26 were truncated. For example, these pressure undulations may result in causing a suspended particle, or a portion of the buoyant layer 6, to pass through passageway 16 to container 10 when, under static pressure conditions, such passage would be designed out of the system. In that regard, it is preferred that the opening 18 of passageway 16 be presented to the tubular member in a vertical plane or cylinder. Presentation of such a vertical opening to the liquid avoids trapping of any air bubbles or suspended particulate matter, during either its ascent or descent thru tubular component 26. Entrapment of these items in passageway 16 may result in their passage therethrough to container 10, thus reducing the effectiveness of the filter.

Container 10, when serving as the ground terminal for the sensing electrode 12, is preferably formed of a tube of conductive material such as copper or brass, for example, or of insulated metal. Alternatively, the container may be formed of a long-wearing insulator, such as plastic, with a separate ground electrode (not shown) provided within the container to cooperate with electrode 12.

In the upper sealing structure for the upper portion of container 10, the feed-through plug for electrode 12 (not shown) may be made out of Lucite. The function of breather plug 36 is to provide an air vent and to prevent liquid evaporation. A small hole is drilled at an angle within the plug, to prevent the escape of liquid molecules while simultaneously allowing for passage of air molecules as the liquid moves up or down within the container 10.

In other configurations (not shown) of the inventive filter, passageway 16 may include serpentine portions, which may be wound about the outer surface of container 10, or may include an elongated horizontal or vertical portion. All such configurations are with the scope of the invention, so long as the openings thereof are vertically displaced with respect to each other as hereinabove described.

It should be appreciated, however, that the concept of the present invention may be used in filtering any fluid in passing from one container to another, and is not limited to use with volume or level measurements. The inventive concept uses gravity and buoyancy to filter a fluid, not necessarily a liquid, passing under pressure effects from one container to another, whether for the performance of tests thereon or for any other purpose.

The foregoing description of a preferred embodiment of the invention has been presented for purposes of illustration and description. It is not intended to be exhaustive or to limit the invention to the precise form disclosed, since many obvious modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted to obtain the full breadth to which they are fairly and legally entitled.

I claim:

1. A filter for a liquid level measurement apparatus having an electrical level sensing probe within a sensing tube receiving liquid from a container, comprising:
   a connecting tube forming a passageway for liquids between said container and said sensing tube, said connecting tube having a first opening within the liquid container and a second opening within the sensing tube,
   said first opening disposed within said container for intaking and outletting liquids at a first level, and
   said second opening disposed within said tube for outletting and intaking liquids at a second level below said first level, said connecting tube having a volume selected to prevent passage of buoyant liquids floating in a layer of a particular height above the liquid in said container to said sensing tube,
   said volume selected to be no less than the volume displaced in said sensing tube by a layer of said buoyant liquid of said particular height in said container.

2. A filter for a liquid level measurement apparatus having an electrical level sensing probe within a sensing tube receiving liquid from a container, comprising:
   a connecting tube forming a passageway for liquids between said container and said sensing tube, said connecting tube having a first opening within the liquid container and a second opening within the sensing tube,
   said first opening disposed within said container for intaking and outletting liquids at a first level, and
   a sampling tube having:
      a port opening for connecting to said first opening of said connecting tube,
      an opening disposed below said first opening of said connecting tube for inlet and drainage of liquid, and;
      a vent opening above said first opening of said connecting tube for venting said sampling tube,
   said sensing tube including an opening for sealingly receiving liquid from said container through the second opening of said connecting tube.

3. The filter for a liquid level measurement apparatus as recited in claim 2 wherein said connecting tube encloses a first volume, and said sampling tube encloses a second volume between the port and vent opening thereof,
   said first volume being selected to be no less than said second volume.

* * * * *